United States Patent
Shenoy et al.

(10) Patent No.: US 7,417,987 B2
(45) Date of Patent: Aug. 26, 2008

(54) DISTRIBUTION OF FORWARDING INFORMATION IN A NETWORK NODE

(75) Inventors: Shiva Shenoy, San Jose, CA (US); Apurva Mehta, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1202 days.

(21) Appl. No.: 10/449,629

(22) Filed: May 30, 2003

(65) Prior Publication Data

US 2003/0223425 A1 Dec. 4, 2003

Related U.S. Application Data

(60) Provisional application No. 60/385,916, filed on Jun. 4, 2002.

(51) Int. Cl.
*H04L 12/28* (2006.01)

(52) U.S. Cl. .................. 370/389; 370/401; 709/242

(58) Field of Classification Search .............. None
See application file for complete search history.

(56) References Cited

U.S. PATENT DOCUMENTS

| | | | |
|---|---|---|---|
| 6,049,524 A * | 4/2000 | Fukushima et al. | 370/220 |
| 6,490,246 B2 * | 12/2002 | Fukushima et al. | 370/220 |
| 6,658,595 B1 * | 12/2003 | Thamattoor | 714/11 |
| 6,885,635 B1 * | 4/2005 | Haq et al. | 370/219 |
| 7,028,224 B2 * | 4/2006 | Mitchell | 714/43 |
| 7,206,309 B2 * | 4/2007 | Pegrum et al. | 370/389 |
| 7,209,449 B2 * | 4/2007 | Tang et al. | 370/238 |
| 7,245,619 B1 * | 7/2007 | Guan et al. | 370/392 |
| 2001/0044904 A1 | 11/2001 | Berg et al. | |
| 2002/0091868 A1 | 7/2002 | Molnar | |
| 2003/0131287 A1 * | 7/2003 | Mitchell | 714/43 |
| 2003/0185226 A1 * | 10/2003 | Tang et al. | 370/428 |

* cited by examiner

*Primary Examiner*—Bob A Phunkulh

(57) ABSTRACT

Distributing forwarding information in a router that has a distributed processing architecture involves distributing the forwarding information from one instance of an operating system to another instance of an operating system in parallel using two different communications channels where one of the communications channels is characteristically reliable yet relatively slow and where the other one of the communications channels is characteristically unreliable yet relatively fast. The forwarding information that is distributed via the relatively fast communications channel can be used to rapidly update forwarding tables such as hardware forwarding tables while the forwarding information that is distributed via the reliable communications channel can be used to resolve errors that may occur during distribution via the relatively fast communications channel. The distribution of forwarding information through parallel channels can be tracked by associating unique sequence numbers with the messages that carry the forwarding information.

20 Claims, 7 Drawing Sheets

|  | Next Expected Sequence Number |
|---|---|
| FIG. 6A | User Space Line Card C — 17 <br> Kernel Space Line Card C — 17 |
| FIG. 6B | User Space Line Card C — 17 ←— 670 <br> Kernel Space Line Card C — 18 [17] |
| FIG. 6C | User Space Line Card C — 18 <br> Kernel Space Line Card C — 18 |
| FIG. 6D | User Space Line Card C — 672 — 19 <br> Kernel Space Line Card C — [18] → 18 |
| FIG. 6E | User Space Line Card C — 19 <br> Kernel Space Line Card C — 19 |
| FIG. 6F | User Space Line Card C — 19 Match <br> Kernel Space Line Card C — 19 —674 |

DISTRIBUTION OF FORWARDING INFORMATION IN A NETWORK NODE

CROSS-REFERENCE TO RELATED APPLICATION

This application is entitled to the benefit of provisional U.S. Patent Application Ser. No. 60/385,916, filed Jun. 4, 2002.

FIELD OF THE INVENTION

The invention relates to distributing forwarding information in a router, and more particularly, to distributing forwarding information between multiple instances of an operating system that exist in a router that has a distributed processing architecture.

BACKGROUND OF THE INVENTION

Network devices such as routers are used to forward traffic in packet-based networks. A typical router is a chassis-based system that includes a control module, which performs higher level management functions, and line cards, which provide the interface between the router and other network devices (i.e., servers, workstations, switches, other routers, etc.) A router generates forwarding information that maps traffic destination information to next hop information. The forwarding information is typically generated and managed in the control module of a router by a route processor. The forwarding information is used by a forwarding engine to make forwarding decisions. First generation routers typically used a centralized architecture to make forwarding decisions for traffic that is received on line cards. In a centralized architecture, forwarding decisions for traffic received on all of the line cards of a router are made by a single central forwarding engine that is supported by a single instance of an operating system. Some newer generation routers use a distributed architecture to make forwarding decisions for incoming traffic. In a distributed architecture router, forwarding decisions for traffic received on the line cards can be made by forwarding engines that exist at each line card. The line card forwarding engines are supported by card-specific instances of an operating system. In order for forwarding decisions to be made locally by the line card forwarding engines, the line card forwarding engines must have access to the forwarding information that is maintained at the control module. Direct access to the forwarding information is accomplished by maintaining an instance of the forwarding information at each line card. In order to maintain instances of the forwarding information at each line card, the forwarding information must be distributed to all of the forwarding engines in the router. Distributing the forwarding information throughout a router with a distributed processing architecture is not a trivial task.

In view of the growing use of distributed architecture routers, what is needed is a fast and reliable technique for distributing forwarding information throughout a distributed architecture router.

SUMMARY OF THE INVENTION

Distributing forwarding information in a router that has a distributed processing architecture involves distributing the forwarding information from one instance of an operating system to another instance of an operating system in parallel using two different communications channels where one of he communications channels is characteristically reliable yet relatively slow and where the other one of the communications channels is characteristically unreliable yet relatively fast. The forwarding information that is distributed via the relatively fast communications channel can be used to rapidly update forwarding tables such as hardware forwarding tables while the forwarding information that is distributed via the reliable communications channel can be used to resolve errors that may occur during distribution via the relatively fast communications channel.

The distribution of forwarding information through parallel channels can be tracked by associating unique sequence numbers with the messages that carry the forwarding information. The sequence numbers are used to identify and resolve transmission errors. In an embodiment, the sequence numbers of messages are compared to expected sequence numbers to determine if duplicate messages have been sent and to determine if messages have been lost.

Other aspects and advantages of the present invention will become apparent from the following detailed description, taken in conjunction with the accompanying drawings, illustrating by way of example the principles of the invention.

BRIEF DESCRIPTION OF THE FIGURES

FIGS. 6A-6F depict an example of how sequence numbers are used to track messages and identify and correct distribution errors.

DETAILED DESCRIPTION

Distributing forwarding information in a router that has a distributed processing architecture involves distributing the forwarding information from one instance of an operating system to another instance of an operating system in parallel using two different communications channels where one of he communications channels is characteristically reliable yet relatively slow and where the other one of he communications channels is characteristically unreliable yet relatively fast. The forwarding information that is distributed via the relatively fast communications channel can be used to rapidly update forwarding tables such as hardware forwarding tables while the forwarding information that is distributed via the reliable communications channel can be used to resolve errors that may occur during distribution via the relatively fast communications channel.

Figure 1:
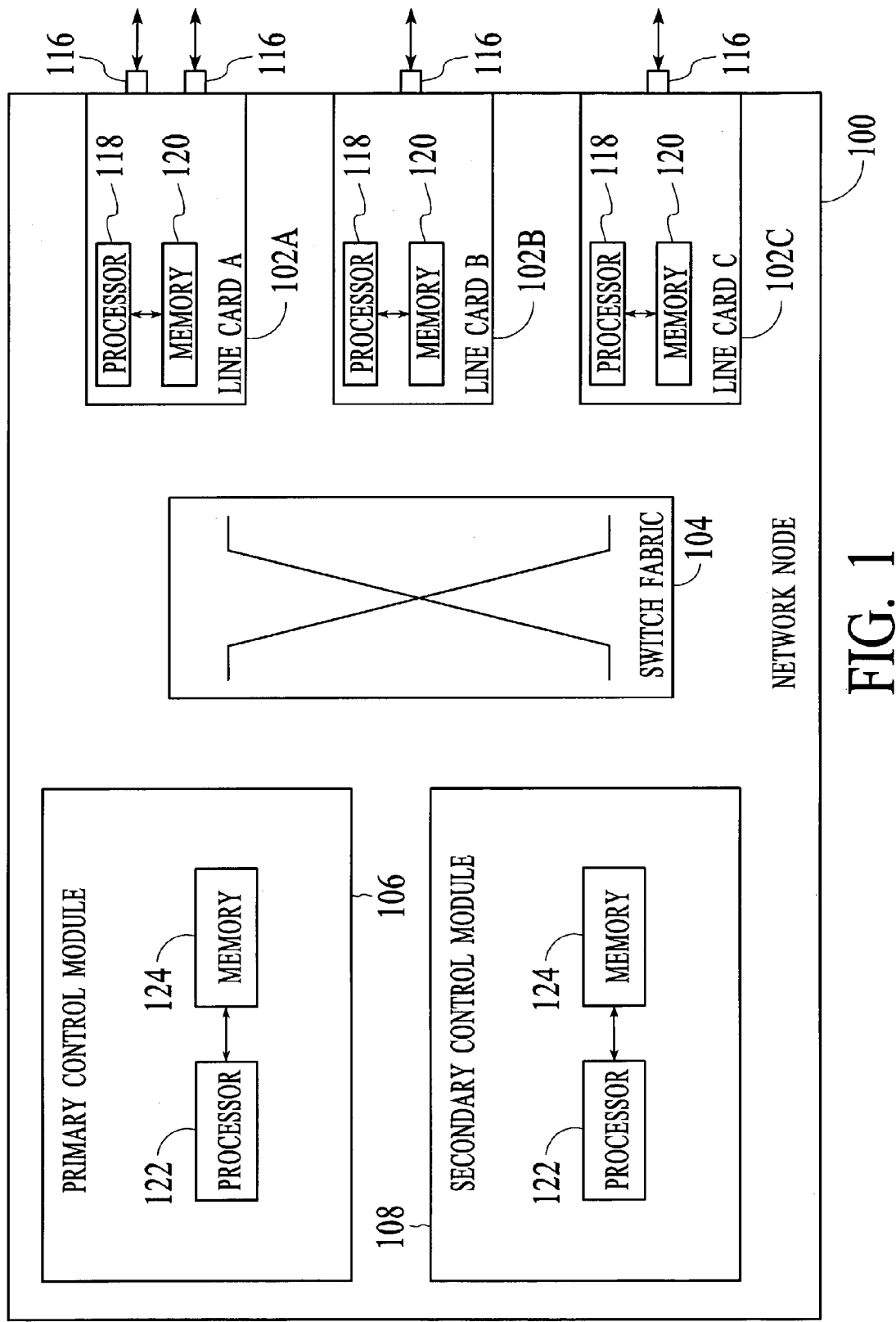
FIG. 1 depicts an embodiment of a network node that has a distributed processing architecture.

FIG. 1 depicts an embodiment of an example network node 100 that has a distributed processing architecture. The example network node includes a primary control module 106, a secondary control module 108, a switch fabric 104, and three line cards 102A, 102B, and 102C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The layers are defined by the International Organization for Standardization (ISO) in the open system interconnect (OSI) model. The network node may include line cards that support network protocols such as Ethernet, ATM, and Frame Relay. Although an Ethernet-based switch/router is described, the disclosed forwarding information distribution techniques can be applied to any network node that has a distributed processing architecture. Throughout the description, similar reference numbers may be used to identify similar elements.

The primary and secondary control modules 106 and 108 support various functions, such as network management functions and protocol implementation functions. Example functions that are performed by the control modules include implementing configuration commands, providing timing control, updating forwarding information, programming hardware tables, providing system information, supporting user interfaces, managing hardware changes, bus management, and protocol processing. Example protocols that are implemented by the control modules include Layer 2 (L2) protocols, such as L2 Learning, spanning tree protocol (STP), and link aggregation control protocol (LACP) and Layer 3 (L3) protocols such as address resolution protocol (ARP), open shortest path first (OSPF) protocol, border gateway protocol (BGP), and intermediate-system to intermediate-system (ISIS) protocol.

In the embodiment of FIG. 1, each of the control modules 106 and 108 includes a processor 122 and memory 124 for carrying out the designated functions. The processor within each control module may include a multifunction microprocessor (such as the Intel386™ processor family) and/or an application specific processor that is operationally connected to the memory. The memory may include electrically erasable programmable read-only memory (EEPROM) or flash ROM for storing operational code and dynamic random access memory (DRAM) for buffering traffic and storing data structures, such as forwarding information. Although the processor and memory are depicted as separate functional units in FIG. 1, in some instances, the processor and memory are integrated onto the same device. In addition, there may be more than one discrete processor unit and more than one memory unit on the control modules. Throughout the description, similar reference numbers may be used to identify similar elements.

The switch fabric 104 provides datapaths between input ports and output ports of the network node 100 and may include, for example, shared memory, shared bus, and crosspoint matrices. Although not depicted, the network node may be equipped with redundant switch fabrics.

Each of the line cards 102A, 102B, and 102C includes at least one port 116, a processor 118, and memory 120, which perform functions such as receiving traffic into the network node, buffering traffic, storing forwarding information, protocol processing, making forwarding decisions, and transmitting traffic from the network node. The processor within each line card may include a multifunction processor (such as an IBM PowerPC® processor) and/or an application specific processor that is operationally connected to the memory. The processor performs functions such as protocol processing, packet parsing, packet classification, and making forwarding decisions. The memory within each line card includes circuits for storing operational code, for buffering traffic, for storing forwarding information, and for storing other data structures. Operational code is typically stored in non-volatile memory such as EEPROM or flash ROM while traffic and data structures are typically stored in volatile memory such as random access memory (RAM). Example data structures that are stored in the RAM include configuration state information and traffic forwarding information. Forwarding information may also be stored in content addressable memory (CAM) or a combination of CAM and RAM. Although the processor and memory are depicted as separate functional units, in some instances, the processor and memory are integrated onto the same device. In addition, there may be more than one discrete processor unit and more than one memory unit on the line cards.

In the embodiment of FIG. 1, the processors 118 and 122 on each line card and on the control modules simultaneously run separate instances of an operating system. Examples of the operating system that is run on each line card include NetBSD, FreeBSD, Solaris, Linux, and Unix. Although some operating systems are identified as examples, other operating systems may be used. In an embodiment, a slim base and open source operating system is used. In an embodiment, the operation system that is used by the control modules is slightly different from the operating system that is used by the line cards. For example, the operating systems for the control modules and line cards may be the same basic operating systems (i.e., NetBSD) that are customized to the particular hardware (i.e., processors and memory) that are supported at the control modules and the line cards.

In an embodiment, forwarding information is generated by the processors (including the line card processors 118 and the control module processor 122) and managed centrally at the primary control module 106. Throughout the description, forwarding information refers to any data element (i.e., ARP entry, route table entry, etc.) that is used to forward traffic in a network. A set of forwarding information (i.e., a set of routing information) is referred to as a forwarding information base (FIB). An instance of an FIB is maintained at the primary control module and is referred to herein as the "main FIB." Instances of the FIB are also maintained at the secondary control module and at the line cards. The instance of the FIB that is maintained at the secondary control module is referred to as the "backup FIB" and the instances of the FIBs that are maintained at the line cards are referred to as the "line card FIBs." In an embodiment, the FIB entries in each FIB are lexicographically ordered. Lexicographically ordering entries in an FIB is well known in the field of packet-based communications.

Figure 2:
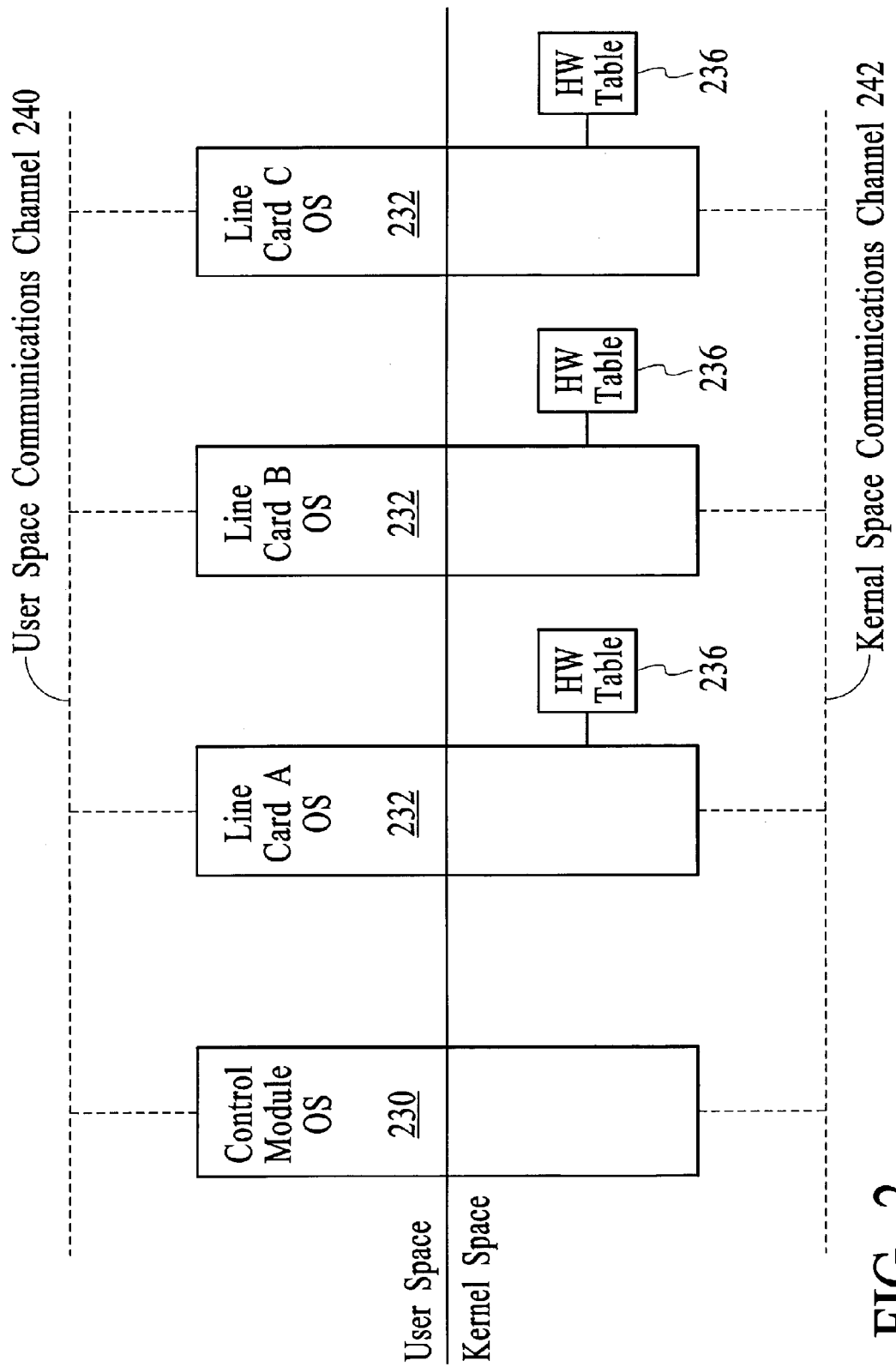
FIG. 2 is a functional depiction of multiple instances of the operating systems that are running in the switch/router of FIG. 1.

FIG. 2 is a functional depiction of multiple instances of the operating systems 230 and 232 that are simultaneously running in the switch/router of FIG. 1. Specifically, operating systems are depicted for the primary control module and the three line cards. In the functional depiction of FIG. 2, the operating system space is logically divided into a "kernel space" and a "user space." Description of an operating system in terms of a kernel space and a user space is well known in the field of computer science. The kernel space of an operating system is the part of the operating system that manages hardware resources, provides fundamental functionality, and provides fundamental programming interfaces to applications that operate in the user space. Example switch/router operations performed in the kernel space include exception packet processing, maintaining statistics, and managing hardware tables that include L2 tables, L3 tables, access control lists (ACLs), quality of service (QoS) tables, and exit port tables.

The user space of an operating system, also referred to as the "userland," is the part of the operating system that includes the applications that are supported by the kernel. The applications perform specific tasks such as network management, configuration management, and L2 and L3 protocol processing. Multiple applications may be running simultaneously in the user space. All of the running applications are supported by, and rely on, the processing resources of the kernel to execute the application calls. Because multiple applications may be running simultaneously in the user space, the applications compete for processing resources in the kernel space.

As described above, forwarding information is stored in hardware tables at the line cards and is used to make fast forwarding decisions. For description purposes, FIG. 2 also depicts hardware tables 236 that are connected to the different instances of the line card operating systems. In the embodiment of FIG. 2, the hardware tables are used to store forwarding information and may include, for example, RAM and/or CAM based tables. The hardware tables are managed by the operating system at the kernel level. That is, changes that are made to data stored in the hardware tables are controlled and implemented at the kernel level. Because changes to the hardware tables are controlled and implemented at the kernel level, the hardware tables are depicted as functionally connected to the operating system at the kernel space level.

FIG. 2 also depicts two different communications channels that are used to communicate information between the different instances of the operating systems. One of the communications channels communicates at the user space level and is referred to herein as the "user space communications channel." The other communications channel communicates at the kernel level and is referred to herein as the "kernel space communications channel." The user space communications channel is logically depicted by the dashed line 240 that connects the operating systems in the user space and the kernel space communications channel is logically depicted by the dashed line 242 that connects the operating system in the kernel space.

The user space communications channel 240 involves communications at the application level. At the application level, software applications that exist in the user space of different instances of the operating systems communicate with each other. For example, an ARP application in the user space of a line card operating system communicates with an ARP application in the user space of the control module operating system using a message protocol. In an embodiment, applications communicate using a transport layer protocol such as transmission control protocol (TCP). TCP communications are accomplished between the instances of the operating systems using well-known port/socket numbers.

Two characteristics of the user space communications channel 240 are that the channel is a very reliable yet a relatively slow channel. The user space communications channel is a very reliable channel because it uses a reliable transport layer protocol such as TCP. The reliability features of TCP include set up control, message acknowledgment, flow control, sequencing, and checksumming. The user space control channel is a relatively slow channel because of the reliability tasks that are implemented by the TCP protocol. In addition, the user space communications channel is relatively slow because using the user space communications channel to distribute forwarding information requires the forwarding information to be passed from the user space to the kernel space so that the forwarding information can be used to update hardware tables. As described above, any application that operates in the user space must compete with all of the other active applications for kernel processing resources. Because of the competition between applications for kernel processing resources, some user space messages (i.e., those that include forwarding information) may be delayed in the transition from user space to kernel space.

The kernel space communications channel 242 involves communications at the kernel level. For example, the kernels of different instances of the operating system communicate directly with each other without passing messages through the user space. In an embodiment, the operating systems communicate with each other at the kernel level through a data link layer protocol. In the embodiment of FIG. 2, the operating systems communicate with each other at the kernel level through an internal Ethernet. Communications via an internal Ethernet involve using standard Ethernet communications techniques to communicate between the control modules and the line cards. For example, the line cards and control modules have internally relevant MAC addresses that are used internally to send messages between the line cards and control modules. In an embodiment, the internal Ethernet is a LAN that is used to exchange information between the different instances of the operating systems. In an embodiment, IEEE 802.3 CSMA/CD is used to communicate over the internal Ethernet.

Two characteristics of the kernel space communications channel 242 are that the channel is an unreliable yet a relatively fast communications channel. The kernel space communications channel is unreliable because it does not utilize a reliable transport layer protocol such as TCP, which has built in reliability features. For example, when using an internal Ethernet as the kernel space communications channel, there is no setup, acknowledgment, or sequence messages that are equivalent to the messages that are generated from TCP. If a message is lost in transmission using an internal Ethernet, there is no mechanism to identify that the message has been lost or to retransmit the lost message. The kernel space communications channel is relatively fast because it does not have to perform any reliability tasks such as those tasks that are performed by TCP. In addition, using the kernel space communications channel to distribute forwarding information is relatively fast because the forwarding information does not enter the user space before it is used to update a forwarding table. That is, forwarding information is sent directly from the kernel space of the source operating system to the kernel space of the target operating system where it is used to update a forwarding table. Because the forwarding information does not pass into the user space, the forwarding information is not in competition with other applications for kernel processing resources.

As stated above, it is desirable to achieve fast and reliable distribution of forwarding information between control modules and line cards in a router that has a distributed processing architecture. In accordance with an embodiment of the invention, fast and reliable distribution of forwarding information is achieved in a router with a distributed processing architecture by distributing the same forwarding information through both a kernel space communications channel and a user space communications channel. The distribution of forwarding information through the kernel space communications channel achieves a relatively fast distribution of the forwarding information while the distribution of forwarding information through the user space communications channel ensures a reliable distribution of the forwarding information. The forwarding information that is received at a target operating system via the kernel space and the user space communications channels can be compared to identify and resolve any transmission errors that may occur.

Figure 3:
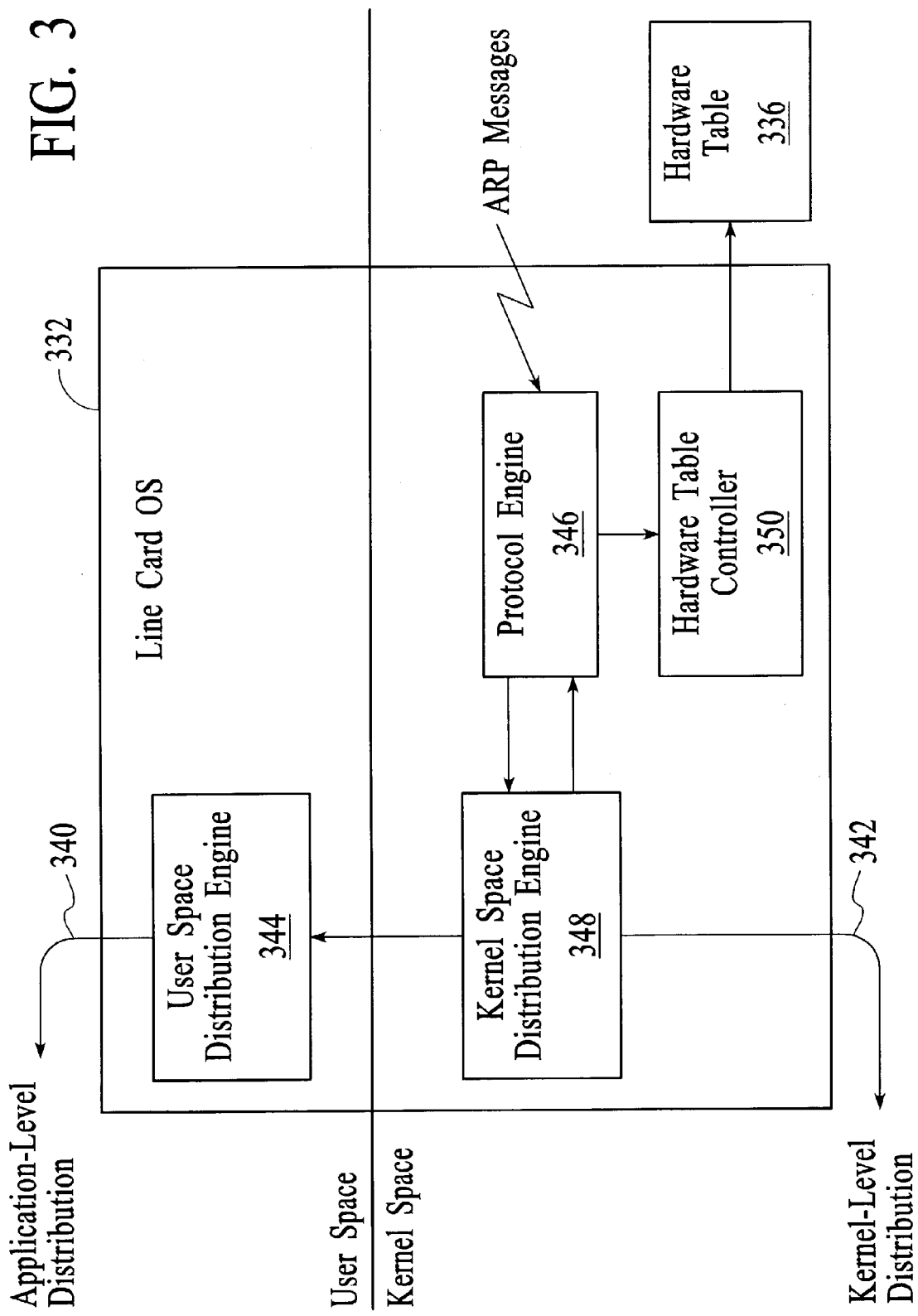
FIG. 3 depicts a system for distributing forwarding information through a user space communications channel and a kernel space communications channel in accordance with an embodiment of the invention.

An embodiment of a system for distributing forwarding information through a user space communications channel and a kernel space communications channel is depicted in FIG. 3. In particular, FIG. 3 depicts an instance of a line card operating system 332 that includes a user space distribution engine 344 in the user space and a protocol engine 346, a kernel space distribution engine 348, and a hardware table controller 350 in the kernel space. The user space distribution engine manages the distribution of forwarding information at the user space level. The kernel space distribution engine manages the distribution of forwarding information at the kernel space level, the protocol engine manages protocol processing at the line card, and the hardware table controller manages the content of the corresponding hardware table, or tables. Although FIG. 3 is described with reference to a line card, in an embodiment, the control modules include similar user space distribution engines, protocol engines, and kernel space distribution engines.

Tasks performed by the user space distribution engine 344 include exchanging forwarding information with other user space distribution engines, passing forwarding information to the kernel space of the respective operating system, and tracking forwarding information messages. Tasks performed by the kernel space distribution 348 engine include exchanging forwarding information with other kernel space distribution engines and tracking forwarding information messages. In an embodiment, forwarding information messages are tracked by associating unique sequence numbers with each forwarding information message. The use of sequence numbers to track forwarding information messages is described in more detail below.

In operation, the protocol engine 346 generates forwarding information that is to be distributed within the network node. For example, the protocol engine may generate forwarding information such as ARP information, which is learned via ARP messages from other connected network nodes. The forwarding information is provided to the kernel space distribution engine 348 for distribution within the network node. The kernel space distribution engine distributes the provided forwarding information (i.e., as forwarding information messages) to its respective user space distribution engine 344. The user space distribution engine transmits the forwarding information to at least one other instance of an operating system using the user space communications channel 340. Using the user space communications channel ensures a reliable delivery of the forwarding information. The kernel space distribution engine also transmits the forwarding information, using the kernel space communications channel 342, to the same instance of an operating system that was targeted by the user space distribution engine. In an embodiment, the forwarding information is sent to the target operating system in parallel from the user space and kernel space distribution engines using the respective user space and kernel space communications channels. The forwarding tables in the user space and kernel space of the target operating system are updated in response to the first of the two messages that is received. Because of the speed of the kernel space communications channel, hardware tables are usually updated in response to forwarding information that is received via the kernel space communications channel.

In an embodiment, forwarding information that is generated at a line card is sent to the control module via the user space communications channel and to the control module and all of the other line cards via the kernel space communications channel. The control module then distributes the forwarding information to the other line cards via the user space communications channel. In an alternative embodiment, forwarding information is initially distributed only to the control module via the two communications channels. The forwarding information is subsequently distributed to the other line cards via the two communications channels.

Figure 4:
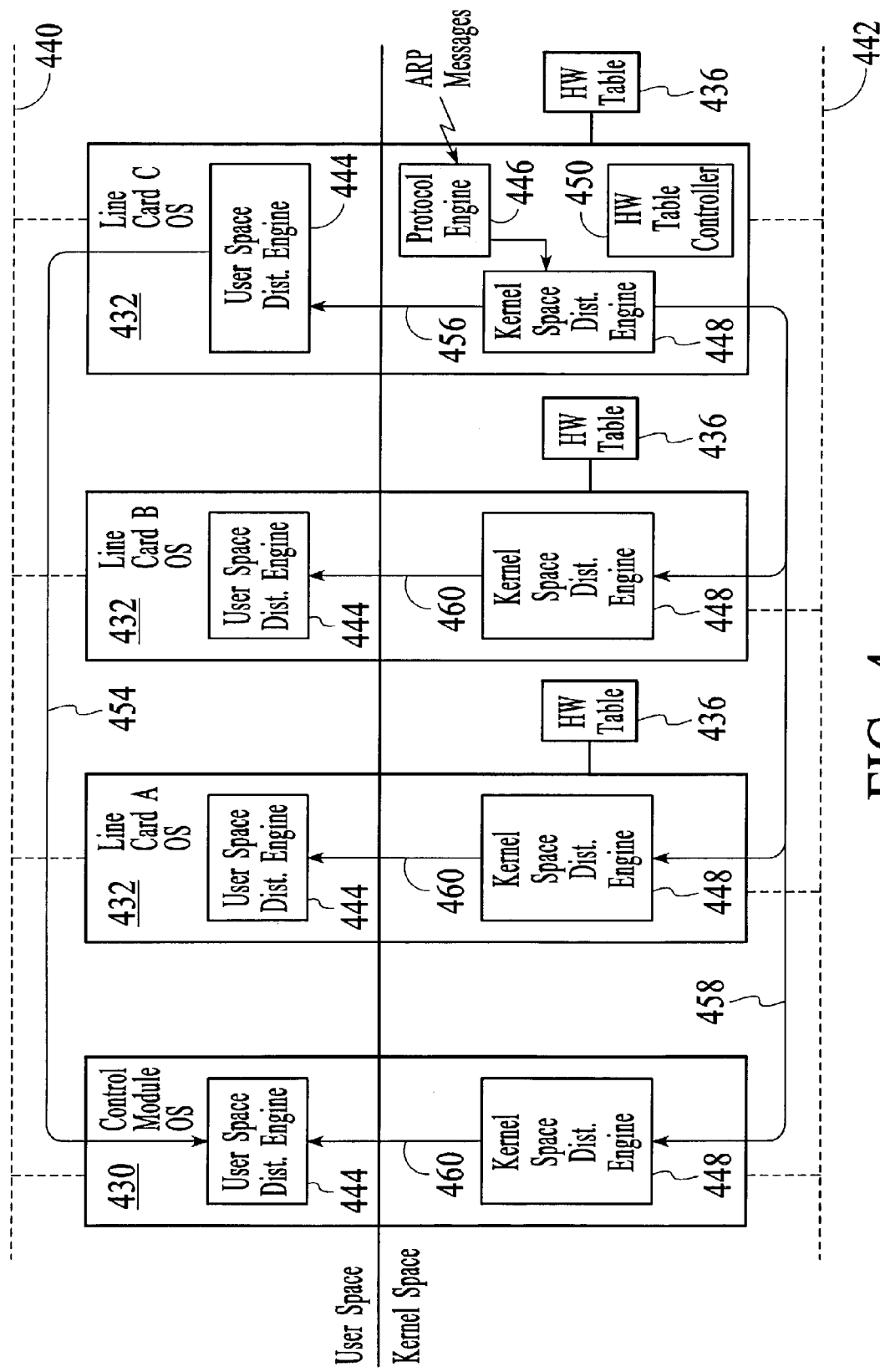
FIG. 4 depicts an example of forwarding information that is distributed in parallel from a line card to a control module using the user space communications channel and the kernel space communications channel in accordance with an embodiment of the invention.

FIG. 4 depicts an example of forwarding information that is distributed in parallel from a line card (e.g., line card C) to a control module using the user space communications channel 440 and from the same line card to the control module and the other line cards (e.g., line cards A and B) using the kernel space communications channel 442. In the example of FIG. 4, forwarding information is generated by the protocol engine 446 of line card C. For example, forwarding information is generated in response to ARP messages. The forwarding information is then provided to the kernel space distribution engine 448 of line card C. The kernel space distribution engine passes a version of the forwarding information to the user space for processing by the user space distribution engine 444, as indicated by arrow 456. The user space distribution engine of line card C transmits the forwarding information to the control module (i.e., the primary control module) using the user space communications channel 440. In particular, the forwarding information is transmitted to the user space distribution engine 440 that exists in the user space of the control module's operating system 430. Distribution of the forwarding information via the user space communications channel is indicated by arrow 454. The kernel space distribution engine also transmits the forwarding information to the control module and to all other instances of the kernel space distribution engine in other line cards using the kernel space communications channel. In particular, the forwarding information is transmitted to the kernel space distribution engine 448 that exists in the kernel space of the control module's operation system 430 and also to the kernel space distribution engines 448 that exist in the kernel space of the line card A and B operating system 432. Distribution of the forwarding information via the kernel space communications channel is indicated by arrow 458. In an embodiment, the kernel space distribution engine of the control module sends a copy of the forwarding information to the user space distribution engine as indicated by arrow 460. Likewise, the kernel space distribution engines of line cards A and B send copies of the forwarding information to their respective user space distribution engine as indicated by arrows 461. In an embodiment, the parallel distribution of the forwarding information via the user space and kernel space communications channels occurs nearly simultaneously. As described above, distributing the forwarding information via the two communications channels ensures fast and reliable distribution.

Figure 5:
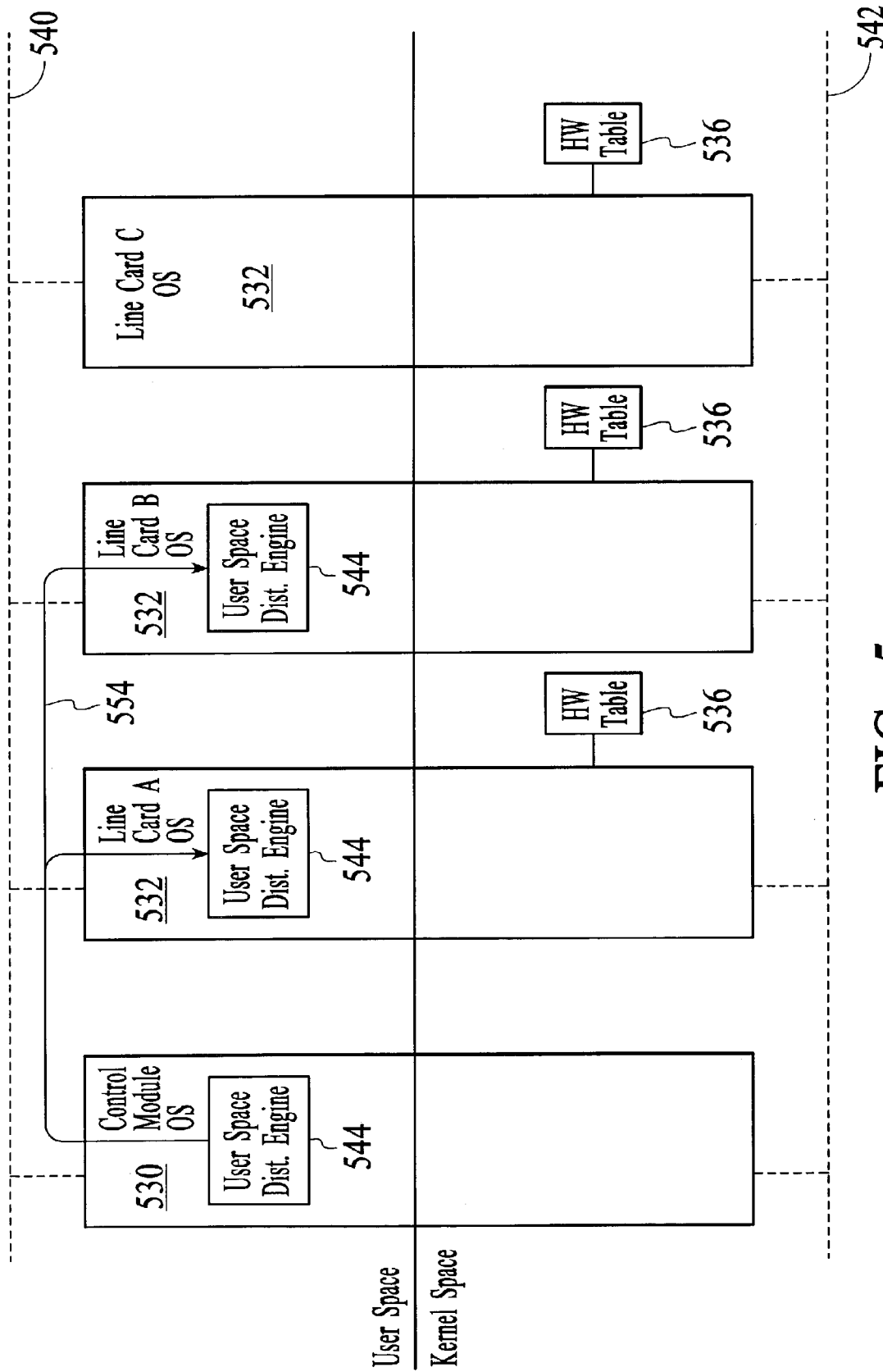
FIG. 5 depicts an example of forwarding information that is distributed from the control module to line cards A and B using the user space and kernel space communications channels in accordance with an embodiment of the invention.

After the forwarding information is distributed from line card C to the user-space distribution engine 544 of the control module, as depicted in the example of FIG. 4, the forwarding information is distributed from the user space distribution engine of the control module to the other line cards (i.e., line cards A and B). FIG. 5 depicts an example of forwarding information that is distributed from the control module to line cards A and B using the user space communications channel. In operation, the user space distribution engine 544 of the control module operating system 530 initiates the distribution of the forwarding information. The forwarding information is distributed to the user space distribution engines 544 of line cards A and B via the user space communications channel 540, as indicated by arrows 554. The forwarding information that is distributed via the user space communications channel can be used to update software forwarding tables at the line cards and to check hardware forwarding tables at the line cards for errors.

Although not described with reference to FIGS. 4 and 5, the secondary control module may be included in the above described communications process. For example, the secondary control module receives forwarding information via both the kernel space and user space communications channels.

Because the same forwarding information is distributed in parallel to the same instance of an operating system, it is desirable to have a mechanism to identify and resolve distribution errors (e.g., identify lost or duplicate messages). In an embodiment, a sequence number is associated with each discrete forwarding information message and the sequence number is used to identify and resolve distribution errors. For example, the sequence numbers are generated by the protocol engine in the kernel space.

In an embodiment, the kernel space and user space distribution engines at each operating system include logic for identifying and correcting distribution errors using sequence numbers. At the user space level, the user space distribution engines maintain a "next expected sequence number" for each line card and control module. With respect to the control module, the user space distribution engine updates the appropriate next expected sequence number each time a message having the expected sequence number is received. For example, the next expected sequence number is updated, on a per line card basis, each time a message having the expected sequence number is received either from the user space communications channel or from the kernel space communications channel. In an embodiment, the user space distribution engine compares the sequence number of each received message with the next expected sequence number to determine whether or not the message has already been received via either the user space communications channel or the kernel space communications channel. If the sequence number of a message matches the next expected sequence number (indicating that the corresponding message was not previously received), then the user space distribution engine forwards the message to the kernel space and increments the next expected sequence number. The kernel space can then use the message to update a forwarding table. If the sequence number of a message received by the user space distribution engine does not match the next expected sequence number (indicating that the corresponding message was previously received), then the user space distribution engine drops the message and does not forward the message to the kernel space.

At the kernel space level, the kernel space distribution engines maintain "next expected sequence numbers" for each line card and control module. With respect to the control module, the kernel space distribution engine maintains a table that contains the next expected sequence number for each line card. Upon receiving a message from a line card, the kernel space distribution engine inspects the sequence number from the message (e.g., an ARP update message) and updates the appropriate forwarding table (e.g., in the kernel space) only if the sequence number of the received message matches the line card-specific next expected sequence number. If the received message matches the sequence number, then the kernel space distribution engine increments its next expected sequence number and sends a message to the user space distribution engine containing the sequence number of the message. At the user space distribution engine, the sequence number of the message is compared to the next expected sequence number. If the sequence number of the message matches the next expected sequence number (which it should since the sequence number matched at the kernel space), then the next expected sequence number in the user space is incremented. Returning to the kernel space distribution engine, if the sequence number of the received message is greater than the next expected sequence number, then the kernel space distribution engine will not use the message to update the kernel space forwarding table in the kernel space and the message is dropped. Typically, the sequence number of a received message will only be greater than the kernel space next expected sequence number when a message, or messages, has been lost during transmission via the kernel space communications channel.

FIGS. 6A-6F depict an example of how sequence numbers are used to track messages and identify and resolve distribution errors. The figures depict the sequence numbers for line card C that are maintained by the user space distribution engine and the kernel space distribution engine of the control module operating system. The sequence numbers of interest include the user space next expected sequence number and the kernel space next expected sequence number. FIG. 6A depicts the state at which message number 16 has been received and processed by both the user space distribution engine and the kernel space distribution engine. Because message 16 has been received and processed by both the user space and kernel space distribution engines, both of the next expected sequence number are set to 17.

Subsequent to the state of FIG. 6A, it is assumed that message number 17 is sent in parallel from line card C to the control module via the user space and kernel space communications channels. It is further assumed that the message is first received at the kernel space distribution engine via the kernel space communications channel. Because the next expected sequence number of 17 matches the sequence number of the message, the message may be used to update a forwarding table in the kernel space and the next expected sequence number is incremented from 17 to 18. FIG. 6B depicts the state of the sequence numbers after the next expected sequence number in the kernel space has been incremented to 18. In addition to incrementing the next expected sequence number from 17 to 18, the kernel space distribution engine also passes a message, as indicated by dashed line 670, to the user space distribution engine that identifies the sequence number of the message that was just received. The user space distribution engine compares the sequence number of the message to its next expected sequence number and if the number matches, then the message is used to update forwarding information in the user space and the next expected sequence number in the user space is incremented. Since it is assumed that the message was first received via the kernel space communications channel, the sequence number of the message should match the user space next expected sequence number. The next expected sequence number in the user space is incremented only if the next expected sequence number was not already incremented in response to the parallel message that was sent via the user space communications channel. FIG. 6C depicts the state of the sequence numbers after all of the next expected sequence numbers have been incremented to 18.

Next, it is assumed that message number 18 is sent in parallel from line card C to the control module via the user space and kernel space communications channels. It is further assumed that the message sent via the kernel space communications channel is lost in transit. When a subsequent message (i.e., message number 19) is received by the kernel space distribution engine, the kernel space distribution engine compares the sequence number of the received message with the next expected sequence number. Because the numbers will not match, the message is not used to update a forwarding table and is dropped. All subsequent messages with non-matching sequence numbers are also dropped. In contrast, the user space distribution engine should receive message 18 via the reliable user space communications channel. Once the message that was sent via the reliable user space communications channel is received by the user space distribution engine, the user space distribution engine will check its next expected sequence number for a match and will use the message to update a forwarding table. It will also increment the next expected sequence number from 18 to 19. FIG. 6D depicts the state of the sequence numbers after the next expected sequence number has been incremented from 18 to 19. In addition to incrementing the next expected sequence number from 18 to 19, the user space distribution engine sends an update message, as indicated by dashed line 672, to the kernel space distribution engine with a sequence number of 18. The kernel space distribution engine determines that the message sequence number matches the next expected sequence number and can use the message to update a forwarding table. The kernel space distribution engine also increments the "next expected sequence number" from 18 to 19. FIG. 6E depicts the state of the sequence numbers after the "next expected sequence number" in the kernel space has been incremented from 18 to 19. In addition to incrementing the next expected sequence number, the kernel space distribution engine may send a message, as indicated by dashed line 674 in FIG. 6F, back to the user space distribution engine indicating that message 18 was a match. In response to the message from the kernel space distribution engine, the user space distribution engine may initiate the distribution of message number 19 to the other line cards, as described above with regard to FIG. 5, via the user space communications channels. As described, the combination of parallel distribution channels and sequence numbers provides a level of redundancy that enables the system to provide fast and highly reliable forwarding information distribution.

Figure 7A:
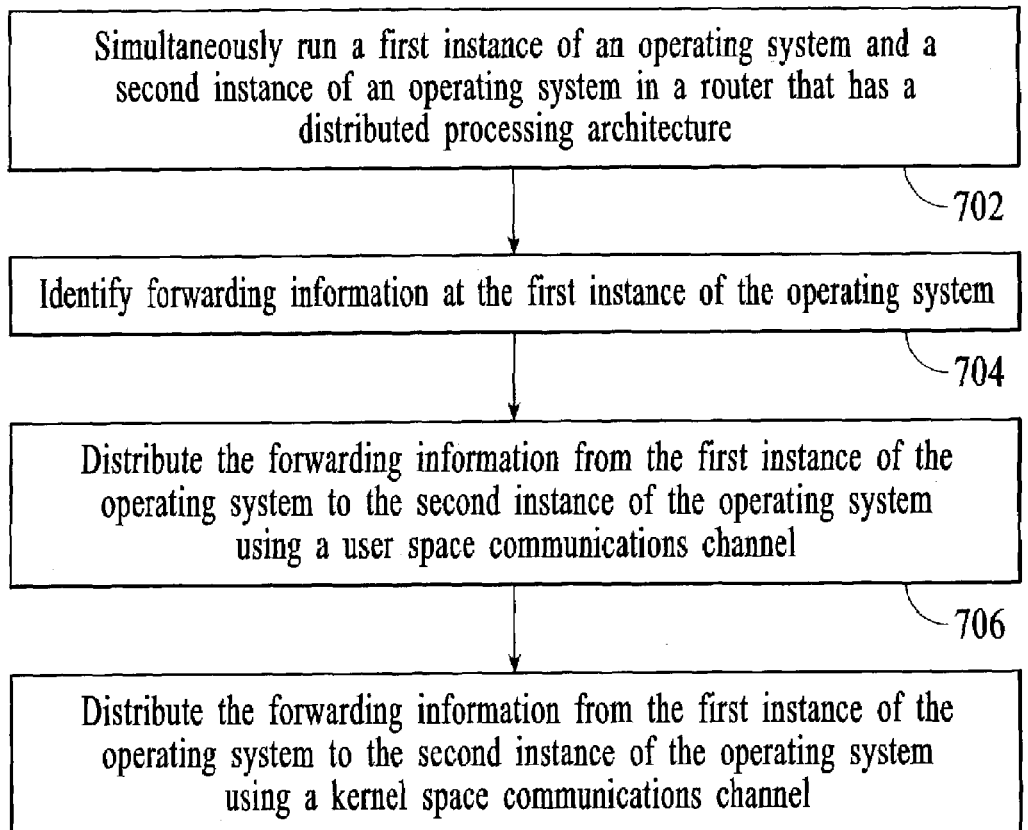
FIGS. 7A and 7B depicts process flow diagrams of a method for distributing forwarding information in accordance with an embodiment of the invention.
Figure 7B:
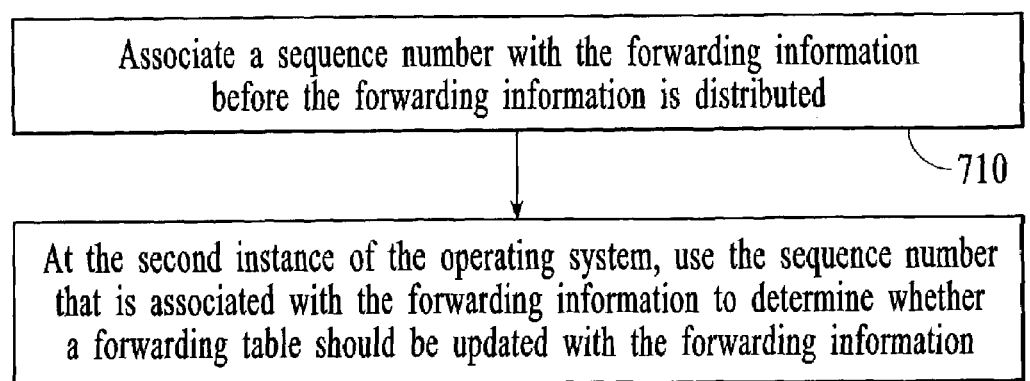

FIGS. 7A and 7B depicts process flow diagrams of a method for distributing forwarding information in accordance with an embodiment of the invention. With reference to FIG. 7A, at step 702, a first instance of an operating system and a second instance of an operating system are simultaneously run in a router that has a distributed processing architecture. At step 704, forwarding information is identified at the first instance of the operating system. At step 706, the forwarding information is distributed from the first instance of the operating system to the second instance of the operating system using a user space communications channel. At step 708, the forwarding information is distributed from the first instance of the operating system to the second instance of the operating system using a kernel space communications channel. With reference to FIG. 7B, in an alternative embodiment, the method of FIG. 7A includes steps 710 and 712. At step 710, a sequence number is associated with the forwarding information before the forwarding information is distributed and at step 712, at the second instance of the operating system, the sequence number that is associated with the forwarding information is used to determine whether a forwarding table should be updated with the forwarding information.

The present invention may be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for distributing forwarding information in a distributed architecture router.

This computer readable media may comprise, for example, RAM contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for distributing forwarding information in a router that has a distributed processing architecture comprising:
    simultaneously running a first instance of an operating system and a second instance of an operating system in a router that has a distributed processing architecture;
    identifying forwarding information at said first instance of said operating system;
    distributing said forwarding information from said first instance of said operating system to said second instance of said operating system using a user space communications channel; and
    distributing said forwarding information from said first instance of said operating system to said second instance of said operating system using a kernel space communications channel, wherein the kernel space communications channel does not pass messages through the user space communications channel.

2. The method of claim 1 further including:
    associating a sequence number with said forwarding information before said forwarding information is distributed;
    at said second instance of said operating system, using said sequence number that is associated with said forwarding information to determine whether a forwarding table should be updated with said forwarding information.

3. The method of claim 1 further including using forwarding information received from said user space communications channel and from said kernel space communications channel to determine how to update a forwarding information base.

4. The method of claim 3 wherein a sequence number that is associated with said forwarding information is used to determine how to update said forwarding information base.

5. The method of claim 1 wherein distributing said forwarding information using said user space communications channel includes transmitting forwarding information messages using the transmission control protocol (TCP).

6. The method of claim 5 wherein distributing said forwarding information using said user space communications channel includes communicating between two applications that are supported by said first and second instances of said operating systems, respectively.

7. The method of claim 1 wherein distributing said forwarding information using said user space communications channel includes communicating between applications in the user space of said operating systems.

8. The method of claim 1 wherein distributing said forwarding information using said kernel space communications channel includes using an internal Ethernet.

9. The method of claim 1 wherein said kernel space communication channel includes direct communications between operating system kernels through an internal Ethernet.

10. The method of claim 1 wherein:
distributing forwarding information using said user space communications channel includes communicating, using transmission control protocol (TCP), between two applications that are supported by said first and second instances of said operating system, respectively; and
distributing forwarding information using said kernel space communications channel includes communicating directly between operating system kernels using an internal Ethernet.

11. A system for distributing forwarding information in a router that has a distributed processing architecture comprising:
a first processor for running a first instance of an operating system;
a second processor for running a second instance of an operating system;
a user space distribution engine, operatively associated with said first instance of said operating system, for distributing forwarding information from said first instance of said operating system to said second instance of said operating system using a user space communications channel; and
a kernel space distribution engine, operatively associated with said first instance of said operating system, for distributing said forwarding information from said first instance of said operating system to said second instance of said operating system using a kernel space communications channel, wherein the kernel space communications channel does not pass messages through the user space communications channel.

12. The system of claim 11 wherein said user space distribution engine includes means for associating a sequence number with said forwarding information before said forwarding information is distributed.

13. The system of claim 12 wherein said second instance of said operating system includes means for using said sequence number that is associated with said forwarding information to determine whether a forwarding table should be updated with said forwarding information.

14. The system of claim 11 further including:
a user space distribution engine, operatively associated with said second instance of said operating system, for receiving forwarding information from said first instance of said operating system via said user space communications channel; and
a kernel space distribution engine, operatively associated with said second instance of said operating system, for receiving forwarding information from said first instance of said operating system via said kernel space communications channel.

15. The system of claim 11 wherein said first processor is located on a control module of said router and said second processor is located on a line card of said router, said system further including a protocol engine, operatively associated with said first instance of said operating system, for providing forwarding information to said user space distribution engine.

16. The system of claim 11 wherein said user space distribution engine uses the transmission control protocol (TCP) to distribute said forwarding information.

17. The system of claim 11 wherein said kernel space distribution engine uses an internal Ethernet to distribute forwarding information.

18. The system of claim 11 wherein said user space distribution engine uses the transmission control protocol (TCP) to distribute said forwarding information and wherein said kernel space distribution engine uses an internal Ethernet to distribute forwarding information.

19. A method for distributing forwarding information in a router that has a distributed processing architecture comprising:
simultaneously running a first instance of an operating system and a second instance of an operating system in a router that has a distributed processing architecture;
generating forwarding information;
distributing said forwarding information in parallel from a first instance of said operating system in said router to a second instance of said operating system using a user space communications channel and a kernel space communications channel.

20. The method of claim 19 further including:
associating a sequence number with said forwarding information before said forwarding information is distributed;
at said second instance of said operating system, using said sequence number that is associated with said forwarding information to determine whether a forwarding table should be updated with said forwarding information.

* * * * *